United States Patent [19]
Rapps et al.

[11] Patent Number: 5,446,332
[45] Date of Patent: Aug. 29, 1995

[54] ULTRASONIC TRANSDUCER

[75] Inventors: Peter Rapps, Karlsruhe; Peter Knoll, Ettlingen; Franz Pachner, Ubstadt; Martin Noll, Nentershausen; Michael Fischer, Kämpfelbach, all of Germany

[73] Assignee: Robert Bosch GmbH, Stuttgart, Germany

[21] Appl. No.: 910,031

[22] Filed: Jul. 28, 1992

Related U.S. Application Data

[63] Continuation of PCT/DE91/00596, July 23, 1991.

[30] Foreign Application Priority Data

Aug. 4, 1990 [DE] Germany .......... 40 24 791.0
Jun. 22, 1991 [DE] Germany .......... 41 20 681.9

[51] Int. Cl.⁶ .......................................... H01L 41/08
[52] U.S. Cl. .............................. 310/324; 310/334; 310/335; 310/321; 381/190
[58] Field of Search .......... 310/322, 324, 334–336, 310/326, 327, 321; 73/625, 628, 629, 632, DIG. 4; 340/384 E, 388; 381/190

[56] References Cited

U.S. PATENT DOCUMENTS

| | | | |
|---|---|---|---|
| 3,396,286 | 8/1968 | Anderson et al. | 310/324 |
| 3,786,202 | 1/1974 | Schafft | 179/110 A |
| 3,873,947 | 3/1975 | Johnson | 310/321 X |
| 3,943,388 | 3/1976 | Massa | 310/324 |
| 4,214,484 | 7/1980 | Abts | 310/335 X |
| 4,276,491 | 6/1981 | Daniel | 310/335 X |
| 4,437,032 | 3/1984 | Gelhard | 310/324 |
| 4,486,742 | 12/1984 | Kudo et al. | 310/324 X |
| 4,556,814 | 12/1985 | Ito et al. | 310/334 |
| 4,561,064 | 12/1985 | Brüggen et al. | 364/561 |
| 4,751,419 | 6/1988 | Takahata | 310/324 |
| 4,996,713 | 2/1991 | Bittencourt | 381/190 |

FOREIGN PATENT DOCUMENTS

| | | |
|---|---|---|
| 0075302 | 3/1983 | European Pat. Off. . |
| 2419642 | 10/1979 | France . |
| 2125784 | 12/1972 | Germany . |
| WO88/08539 | 11/1988 | WIPO . |

*Primary Examiner*—Mark O. Budd
*Attorney, Agent, or Firm*—Frishauf, Holtz, Goodman & Woodward

[57] ABSTRACT

Several exemplary embodiments for an ultrasound transducer are suggested, in which the sound propagation in the vertical plane is narrow-angled and in the horizontal plane wide-angled by means of appropriate damping measures. The effect on the propagation characteristic is achieved by means of the embodiment in accordance with the invention of the oscillating diaphragm and/or the housing, as well as multiple disposition of piezo oscillators. Because of these measures, damping of the sound waves or the sensitivity of the sensor is approximately the same over the entire horizontal angle up to almost 180°.

4 Claims, 3 Drawing Sheets

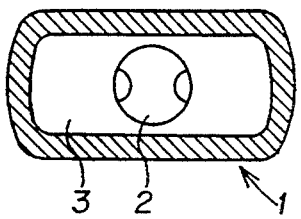 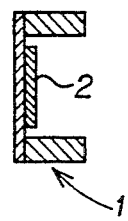
FIG. 5a  FIG. 5b
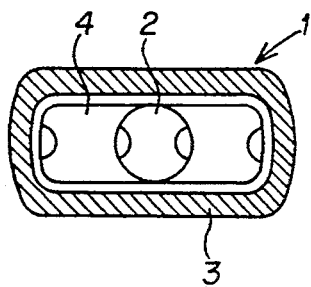 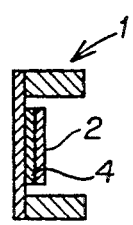
FIG. 6a  FIG. 6b
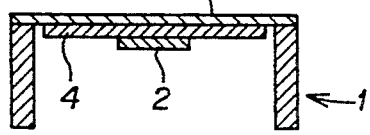
FIG. 6c
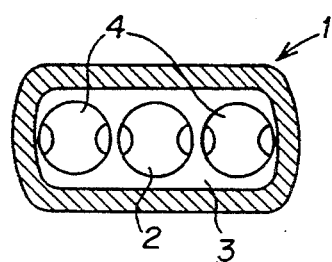
FIG. 7a
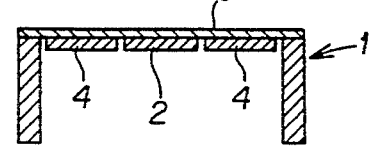
FIG. 7b

5,446,332

ULTRASONIC TRANSDUCER

This is a continuation of PCT/DE91/00596, filed on Jul. 23, 1991.

FIELD OF THE INVENTION

The invention relates to an ultrasound transducer.

BACKGROUND

An ultrasound transducer is already known from German Published, Non-Examined Patent Application DE-OS 31 37 745, GELHARD, and corresponding U.S. Pat. No. 4,437,032 which is formed as a pot-type transducer. A casting compound has been applied to defined places of its pot as a damping means, which very strongly suppresses the propagation of sound in the damped directions when the ultrasound transducer is transmitting. Sound propagation in the direction of the non-damped horn takes place with appropriately high energy, without damping.

When receiving sound waves, the sensitivity at the damped places of the horn is particularly low, so that sound waves essentially can only be received from the undamped directions.

Pot-type transducers of this type have the property that the transmitting angle in the damped direction is relatively narrow, while it is relatively wide in the undamped direction. For example, if it is intended to detect obstacles without gaps in back of a motor vehicle, several such sensors must be arranged side-by-side.

THE INVENTION

In contrast to the above, the ultrasound transducer of the present invention has the advantage that the shape of the diaphragm or the housing provide the desired directional damping, so that casting compounds are not required.

In a first embodiment of the invention, it is particularly advantageous that the wall of the diaphragm is reinforced on two opposite sides. Because of this, the manufacture of the ultrasound transducer becomes particularly simple and cost-effective.

An advantage in connection with a further embodiment is that an approximately rectangular shape of the housing with an appropriately adapted diaphragm is used for the ultrasound transducer. Because of this, it is possible in an advantageous manner to omit additional damping means, because, in an ultrasound transducer which is operated on the first dominant wave, the formation of side lobes is prevented by the shape of the diaphragm.

If the long side of the ultrasound transducer is disposed parallel to the plane of the vehicle, the transmitting angle of the ultrasound lobe is relatively narrow in the vertical direction, while it is very broad in the horizontal direction. By means of this, it is possible, for example, to monitor the area of interest, for distance measuring in connection with a motor vehicle, with few sensors.

This structural shape can be produced without additional cost, for example by the extrusion process.

An advantageous embodiment of the ultrasound transducer ensues if the rectangular diaphragm is initially covered with a first piezo transducer and then a second, circular piezo transducer is disposed on this piezo transducer. By exciting the first and second piezo transducers, it is advantageously possible to transmit a wide, as well as a narrow, sound lobe in the horizontal direction. By superimposition of the ultrasound lobes, no gaps appear in the total characteristic for the sound lobe. This results in the advantage that it is possible, in many cases, to omit the horns.

A further advantageous embodiment is seen in that three similar piezo sensors are disposed in a row next to each other. Excitation can take place in equiphase or antiphase very simply with different frequencies, so that a gap-free ultrasound lobe is generated.

Cost-effective embodiments of the ultrasound transducer result from making the housing of plastic, which can be worked particularly easily in a simple extrusion process.

Further advantages of the invention are found in the description.

DRAWINGS

Exemplary embodiments of the invention are illustrated in the drawings and explained in detail in the following description:

Figure 3A:
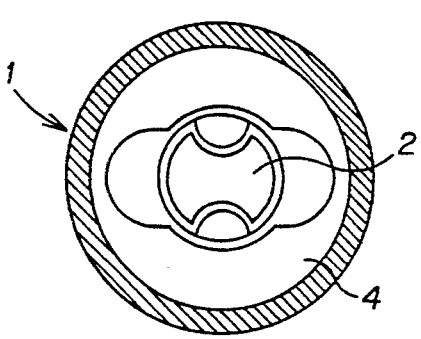
Figure 3B:
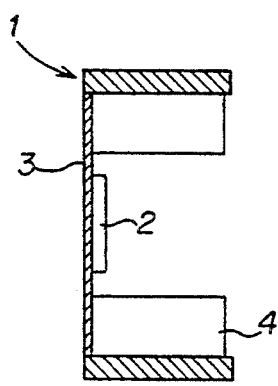
Figure 4A:
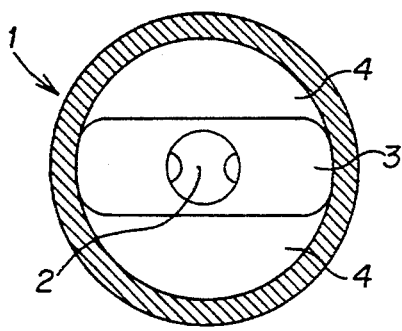

FIGS. 3a and b illustrate an ultrasound transducer in accordance with the state of the art;

FIGS. 4a and b illustrate a first exemplary embodiment;

FIGS. 5a and b illustrate a second embodiment;

FIGS. 6a, b, c illustrate a third exemplary embodiment; and

FIGS. 7a, b illustrate a fourth exemplary embodiment.

DESCRIPTION OF THE EXEMPLARY EMBODIMENTS

Figure 1A:
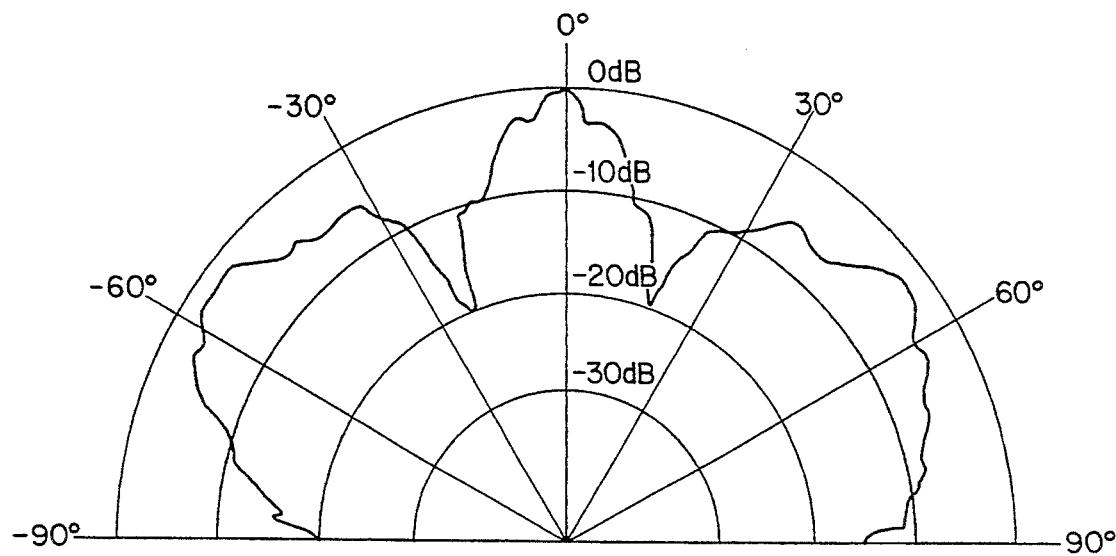
FIGS. 1a and 1b are graphic representations of the ultrasound lobes.

Diagrams are shown in FIGS. 1a and b which represent the transmitting characteristic of an ultrasound transducer in accordance with the invention. In FIG. 1a, the horizontal transmitting characteristic is shown. It can be seen from this that damping in the main lobe of the ultrasound waves is small in the range around 0°. With an increasing propagation angle, damping of the sound waves is somewhat greater and again becomes smaller in the side lobes in the range between 30° and 80°. Thus, the damping curve illustrated has a wide-angle transmitting characteristic in the horizontal direction.

Figure 1B:
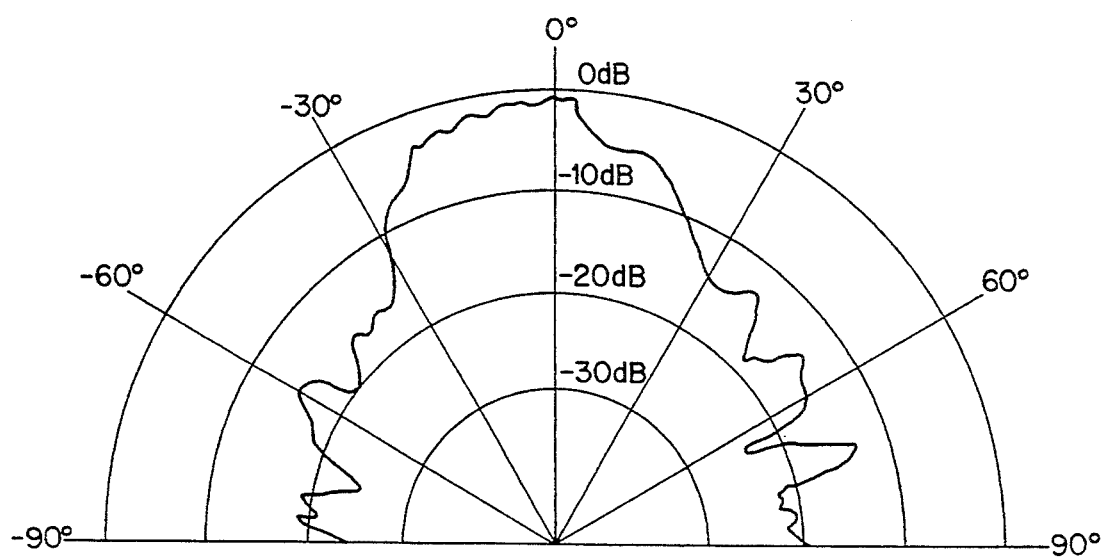

In FIG. 1b, the vertical transmitting characteristic of the subject of the invention is shown. It can be seen from this illustration that damping is least in the 0° range and increases with increasing angles. Thus, the vertical transmitting characteristic can be considered to be narrow-angled.

Figure 2:
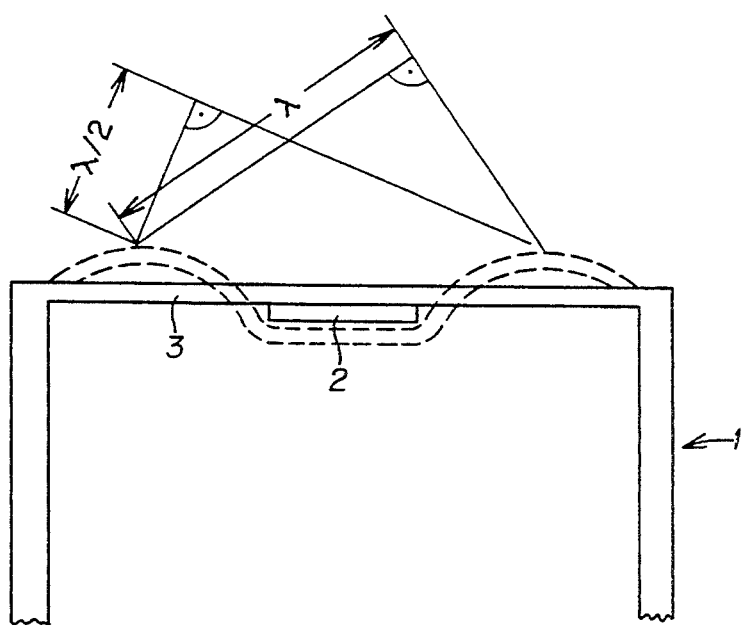
FIG. 2 is a sectional view.

A sectional view of a known ultrasound transducer is shown in FIG. 2, which represents the basic function of sound wave generation. When triggered by an a.c. signal, the piezo oscillator 2 disposed on the diaphragm 3 causes the diaphragm 3 to become deformed in correspondence to the frequency of the trigger voltage, because of which it generates oscillations. The piezo oscillator 2 has been glued on the center of the diaphragm 3. With a suitably chosen diameter of the piezo oscillator 2, for example a third of the diaphragm diameter, the diaphragm will oscillate in antiphase in relation to the adjacent areas in the middle range. The ultrasound lobe transmitted by the sensor is generated from the superimposition of the spherical waves emanating from the three oscillation centers. In this way, a strong main lobe forms in the forward direction which is generated by the constructive interference of the two side areas oscillating in equiphase. Constructive interference is also present when the path difference of the two partial waves is a whole-number multiple of the wave length λ, which in accordance with FIG. 1a leads to the side lobes. If the path difference is λ/2, destructive interference (cancellation) occurs, which can be seen in accordance with FIG. 1a in the heavier damped areas at approximately ±20° to 25°. Depending on how great the deformation of the diaphragm 3 is, corresponding main maxima are formed, for example in the 0° direction, i.e. in the direction of the planar vertical in relation to the piezo oscillator or minima and side maxima.

In the exemplary embodiments in accordance with the invention, it is therefore attempted to influence the propagation characteristic of the ultrasound lobe in the dominant wave, as well as in the first harmonic wave, by damping the diaphragm 3 at suitable sites and by suitable means.

In an ultrasound transducer known from German Published, Non-Examined Patent Application DE-OS 31 37 745, a casting compound was applied for determining the transmission characteristic below the diaphragm 3 and at the housing 1, the hardness of which is different from that of the diaphragm 3 (FIGS. 3a, b). The casting compound must be filled into the housing later, after the installation of the diaphragm. In contrast thereto, no casting compound is required with the subject of the invention.

Figure 4B:
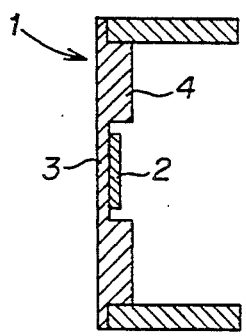

A first exemplary embodiment of the invention is shown in FIG. 4a in a top view and, in FIG. 4b, in section. The housing 1 is formed to be circular and has a diaphragm 3, which is reinforced on two opposite sides 4. The difference from the known ultrasound transducer consists in that the diaphragm or membrane 3 is reinforced with the same material on the two opposite sides. Such a diaphragm can be very cost-effectively produced by an extrusion process.

A second exemplary embodiment of the invention is shown in FIG. 5a, in a top view, and, in 5b, in section. It also has a ring-shaped housing 1 which, however, is formed somewhat rectangular or oval, and has a matched diaphragm 3. A round piezo oscillator 2 is disposed in the center of the diaphragm 3. The essential advantage of this exemplary embodiment, over the previously described one, lies in that the damped areas 4 of the membrane 3 can be omitted from the outset. Because the housing 1 can also be produced by an extrusion process, its manufacturing costs are low, and can be compared with those of the circular exemplary embodiment.

A third exemplary embodiment of the invention is shown in FIG. 6a, in a top view, and, in 6b and c, in lateral views. The same as the second exemplary embodiment, it has an approximately rectangular housing and a correspondingly matched diaphragm shape. First, a piezo oscillator 4 which covers nearly the entire diaphragm surface is glued to the inside of the diaphragm. A round piezo oscillator 2 has been disposed centered on the piezo oscillator 4. The round piezo oscillator 2 corresponds to the piezo oscillator of the previous exemplary embodiments.

The way this arrangement functions is as follows: the piezo oscillator 4 which covers nearly the entire diaphragm 3 is particularly suited to excite the diaphragm 3 on the dominant wave. In the course of this, a sound lobe is transmitted in the horizontal which is similar, in its characteristic of the main lobe, to that of FIG. 1b.

Because of the elongated extent of the diaphragm 3, the main lobe is wider in the horizontal than in the vertical. The round piezo oscillator 2 excites the diaphragm with the glued-on piezo oscillator 4 to a sound transmission with a transmission characteristic as was already shown in FIG. 1a. Now, if the piezo oscillator 2 and the piezo oscillator 4 are alternately excited, one time a narrow, and another time a wide, a sound lobe is excited in the horizontal, where both sound lobes are superimposed on each other in such a way that the minima in the characteristic of the piezo oscillator 4 are filled in by the sound lobe parts of the piezo oscillator 2, so that no gaps are created in the total characteristic.

The particular advantage of this exemplary embodiment thus lies in that the sound propagation in the horizontal is nearly undamped over the entire transmission range. Because of that, a horn can be dispensed with, because no portion of the side lobes need be reflected into the gaps in the transmission characteristic.

A fourth exemplary embodiment of the invention is shown in FIG. 7a in a top view and in FIG. 7b in section. As in the exemplary embodiment, the housing 1 has an approximate rectangular shape. The diaphragm has the same shape as previously described. Three similar piezo oscillators 2 are disposed in a row next to each other on the diaphragm. Depending on the triggering, the transducer can be excited selectively on the dominant wave or on the first harmonic wave. Excitation on the dominant wave takes place when all three piezo oscillators 2 are triggered simultaneously and equiphased. Excitation on the first harmonic wave takes place when the center piezo oscillator is excited in antiphase to the two outer piezo oscillators. A broad sound lobe without minima can be generated by intermittent triggering at different phase positions.

The position of the minima and maxima in the sound field distribution, as shown in FIGS. 1a and 1b, is frequency-dependent. It has been proven to be advantageous that it is possible to vary the position of the minima and maxima by variations in the frequency (wobbling) in such a way that a gap-free transmission characteristic in the horizontal is generated over the temporal mean. The strong damping areas are omitted, so that the sensor has almost equal sensitivity in the horizontal in a range up to approximately 180°.

In general, metals, for example aluminum, are used for producing the housing. The resilient properties of the metals aid the formation of oscillations of the sound waves. To reduce the processing expense for the metal housings it has been shown to be advantageous to make the housings of a plastic material. Particularly suited for this are so-called anisotropic polymers, which have resilient properties comparable to those of the metals used. The plastic housings can be produced in a simple extrusion process.

Ultrasound transducers of the described construction show pronounced post-pulse oscillations after the energy supply needed for transmission has been turned off. This is disturbing if one and the same ultrasound transducer is used for transmission as well as for the reception of the echo and when it is intended to detect echoes having short transit times. In this case, it is possible that the echo signal is superimposed on the decaying signal of the transducer and can no longer be detected by simple means. Therefore it is provided, in a further embodiment of the invention, to equip the diaphragm 3 on its inside with a damping layer, either over the entire surface or over parts thereof to shorten post-pulse oscillations. In this connection, it has been provided to glue on a foil as damping layer or to pour an appropriate casting compound on the inside of the diaphragm 3. The resilience of the damping layer is selected to be such that the diaphragm oscillates at the desired resonance frequency when energy is supplied. After shutting off the energy supply, the oscillations are to fade as rapidly as possible.

We claim:

1. An ultrasound transducer comprising
   a diaphragm (3) which can be excited to oscillate,
   a ring-shaped housing (2) bordering said diaphragm,
   at least a first one piezo oscillator located on said housing (2), said oscillator having an oscillation characteristic which can be damped in preselected directions,
   wherein
   the diaphragm (3) and the housing (2) are formed approximately rectangular;
   at least one piezo oscillator is located on the diaphragm;
   and a second piezo oscillator (4), which has almost the surface area of the diaphragm (3), is located between the first piezo oscillator and the diaphragm (3).

2. An ultrasound transducer in accordance with claim 1, characterized in that
   the piezo oscillators (2, 4) can be alternatingly excited to oscillate.

3. An ultrasound transducer in accordance with claim 1, characterized in that
   at least one further piezo oscillator is disposed on each of two opposite sides of the first piezo oscillator (2).

4. An ultrasound transducer in accordance with claim 3, characterized in that
   the center and the outer piezo oscillators are adapted to be excited alternatingly in equiphase or antiphase.

* * * * *